(12) United States Patent
Mock et al.

(10) Patent No.: US 7,508,300 B2
(45) Date of Patent: Mar. 24, 2009

(54) METHOD AND SYSTEM FOR PASSENGER PROFILES

(75) Inventors: Von A. Mock, Boynton Beach, FL (US); Isabel M. Fernandez, Lauderdale by the Sea, FL (US); Juan C. Fernandez, Boca Raton, FL (US); Jorge L. Perdomo, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 232 days.

(21) Appl. No.: 11/468,888

(22) Filed: Aug. 31, 2006

(65) Prior Publication Data

US 2008/0061988 A1 Mar. 13, 2008

(51) Int. Cl.
*B60Q 1/00* (2006.01)
(52) U.S. Cl. .................... 340/438; 340/439; 340/425.5; 340/539.11; 340/426.28; 340/573.1; 455/345; 455/517; 455/566; 701/117; 701/124
(58) Field of Classification Search ................. 340/438, 340/439, 425.5, 539.11, 426.28, 573.1; 455/345, 455/517, 566; 701/117, 124
See application file for complete search history.

(56) References Cited

U.S. PATENT DOCUMENTS 5,736,940 A * 4/1998 Burgener .................... 340/994
5,859,628 A * 1/1999 Ross et al. .................. 345/173
6,888,443 B2 * 5/2005 Ritter ......................... 340/5.64
6,957,142 B2 10/2005 Entenmann
2004/0209594 A1 10/2004 Naboulsi

OTHER PUBLICATIONS

U.S. Appl. No. 11/247,485, filed Oct. 11, 2005—Mock, Von A.

* cited by examiner

*Primary Examiner*—Tai T Nguyen
(74) *Attorney, Agent, or Firm*—Larry G. Brown

(57) ABSTRACT

The invention concerns a method (200) and system (100) for providing a passenger profile. The method can include the steps of receiving (212) one or more passengers having mobile units (112) in a vehicle (110) in which at least some of the mobile units have been programmed with passenger profiles and receiving (214) the passenger profiles from the mobile units. The method can also include the step of informing (216) at least the driver of the vehicle of the passenger profiles once the passenger profiles are received. As an example, setting one or more parameters of the vehicle can be based on the received passenger profiles. In addition, setting the parameters of the vehicle based on the received passenger profiles may restrict the operation of the vehicle in a predefined manner.

14 Claims, 2 Drawing Sheets

100

METHOD AND SYSTEM FOR PASSENGER PROFILES

BACKGROUND OF THE INVENTION

1. Field of the Invention

The present invention concerns a personal communication network and more particularly, such a network to establish profiles for passengers in a vehicle.

2. Description of the Related Art

With ever increasing traffic on the nation's highways, the risk of vehicular accidents is prevalent. As such, parents have concerns about letting their children ride in vehicles driven by teenagers or adults associated with a particular function, like a church van or some other vehicle serving a social function. Parents may warn these drivers to take extra precautions with their children, but such notices may carry little weight with certain drivers. Thus, there is a need for parents or other guardians to exercise some control over vehicles in which their children may be riding.

SUMMARY OF THE INVENTION

The present invention concerns a method of providing a passenger profile. The method can include the steps of receiving one or more passengers having mobile units in a vehicle in which at least some of the mobile units have been programmed with passenger profiles, receiving the passenger profiles from the mobile units and informing at least the driver of the vehicle of the passenger profiles once the passenger profiles are received. The method can also include the step of setting one or more parameters of the vehicle based on the received passenger profiles. As an example, setting the parameters of the vehicle based on the received passenger profiles may restrict the operation of the vehicle in a predefined manner. For example, the parameters can include a maximum speed of the vehicle, a restriction on the use of portable electronic devices by the driver, a preferred or recommended travel route, a restricted area of travel, an enablement of a landmark notification signal or an enablement of a threshold variance signal.

In one arrangement, receiving the passenger profiles from the mobile units includes receiving the passenger profiles wirelessly through a Bluetooth transmission or an Institute of Electrical and Electronics Engineers (IEEE) 802.15.4 standard transmission. Further, informing the driver of the vehicle of the passenger profiles can include signaling a mobile unit of the driver or a communication system of the vehicle with the passenger profiles. Informing the driver of the vehicle of the passenger profiles may include broadcasting at least a portion of the passenger profiles over an audio system of the vehicle or a display unit of the vehicle.

The present invention also concerns a method of generating a passenger profile. The method can include the step of programming a mobile unit of a passenger of a vehicle with one or more settings that are associated with vehicular travel to create the passenger profile. A driver of the vehicle may be informed of at least a portion of the passenger profile when the mobile unit comes within a predetermined range of the vehicle.

The present invention also concerns a mobile unit for generating a passenger profile. The mobile unit can include a user interface that receives one or more settings—which can be associated with vehicular travel of a passenger and form the passenger profile—a transceiver and a processor coupled to the transceiver. The processor can be programmed to cause the transceiver to transmit at least a portion of the passenger profile when a user of the mobile unit becomes a passenger of a vehicle such that a driver of the vehicle is made aware of the passenger profile. The mobile unit can also include a memory for storing the passenger profile. Following the transmission of the passenger profile, the passenger profile may set one or more parameters of the vehicle.

The present invention also concerns a vehicle control system for receiving one or more passenger profiles. The control system can include a transceiver that receives the passenger profiles within a predetermined range of the vehicle in which the passenger profiles are associated with passengers of the vehicle and a notification unit that informs a driver of the vehicle of at least a portion of the passenger profiles. The control system can further include a processor coupled to the transceiver that is programmed to set one or more parameters of the vehicle based on the passenger profiles. As an example, the notification unit can include a speaker or a display. Also, the transceiver and notification unit may be integrated into the vehicle or a mobile unit carried by the driver.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE INVENTION

Figure 1:
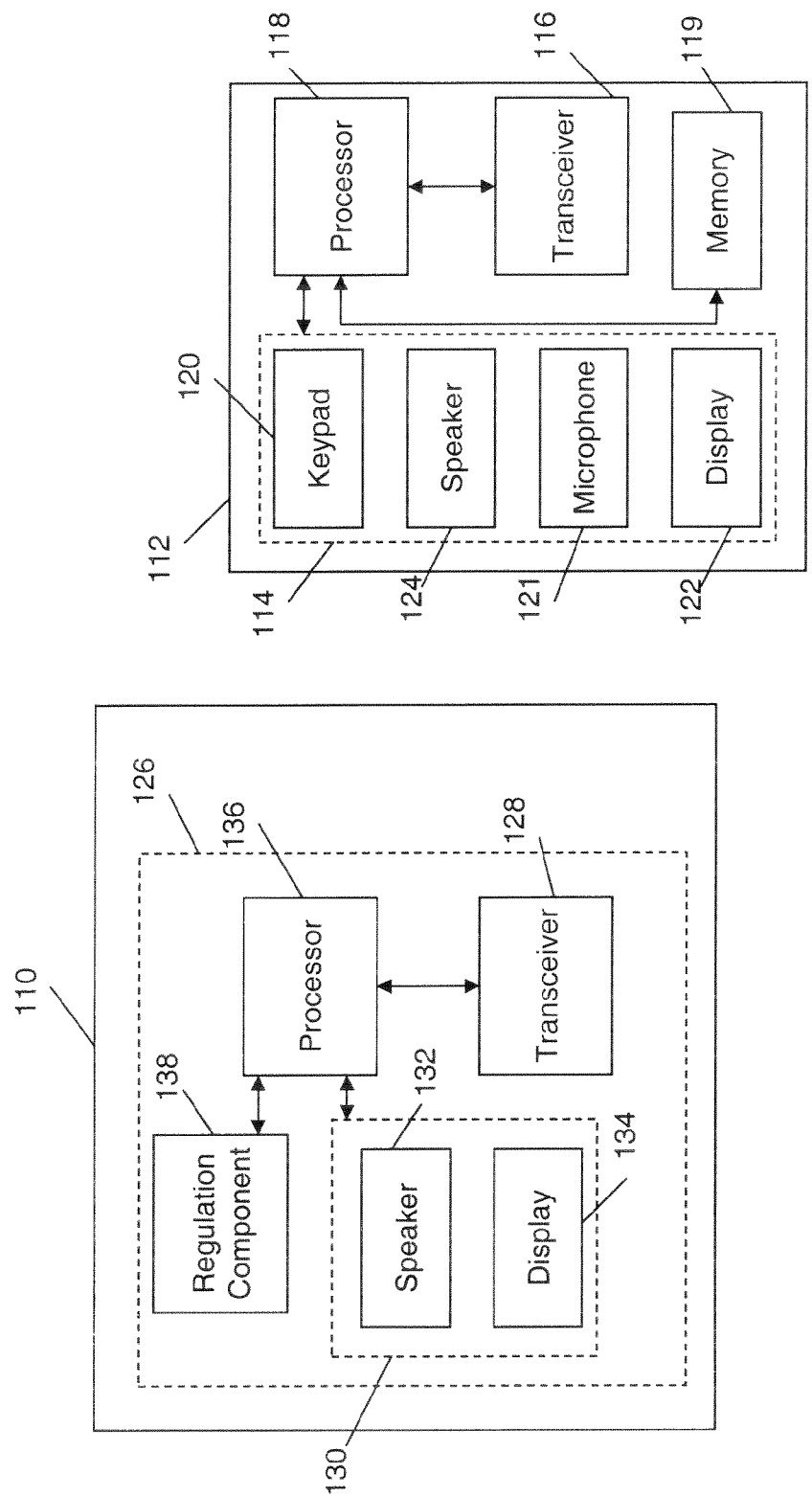
FIG. 1 illustrates a system for passenger profiles in accordance with an embodiment of the inventive arrangements.

While the specification concludes with claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled" as used herein, are defined as connected, although not necessarily directly, and not necessarily mechanically. The term "processor" can include any component or group of components, including any relevant hardware and/or software, that can carry out the functions described in relation to the inventive arrangements herein. The term "mobile unit" can be defined as any portable electronic device capable of receiving and/or transmitting wireless and/or hard-wired communication signals. "Passenger" can be defined as any object capable of being transported by a vehicle, including animate and inanimate objects, and refers to an object that is currently being transported by the vehicle or an object that is scheduled or likely to be transported by the vehicle.

The invention concerns a method and system for providing a passenger profile. The method can include the steps of receiving one or more passengers having mobile units in a vehicle in which at least some of the mobile units have been programmed with passenger profiles and receiving the passenger profiles from the mobile units. The method can also include the step of informing at least the driver of the vehicle of the passenger profiles once the passenger profiles are received.

In one arrangement, setting one or more parameters of the vehicle can be based on the received passenger profiles. In addition, setting the parameters of the vehicle based on the received passenger profiles may restrict the operation of the vehicle in a predefined manner. As an example, the parameters can include a maximum speed of the vehicle, a restriction on the use of portable electronic devices by the driver, a preferred or recommended travel route, a restricted area of travel, an enablement of a landmark notification signal or an enablement of a threshold variance signal. Such a method can enable, for example, a parent or guardian of a child to place limits or restrictions on vehicles in which the child is traveling to help protect the child from dangerous driving conditions.

Referring to FIG. 1, a system 100 for creating and implementing passenger profiles is shown. In one arrangement, the system 100 can include a vehicle 110 and one or more mobile units 112. The vehicle 110 can be any means of transportation capable of ferrying at least one passenger, such as a car, a bus, a train, an airplane, although the vehicle 110 is not limited to a mechanized component In addition, a driver can be assigned to the vehicle 110. A driver can be defined as an entity, whether human or machine, that controls the operation of the vehicle 110 while the vehicle 110 is ferrying one or more passengers. As an example, the driver may carry a mobile unit 112, and one or more of the passengers who will ride the vehicle 110 can carry a mobile unit 112.

The mobile unit 112 may include a user interface 114 for receiving input from a user, a transceiver 116 for receiving and/or transmitting wireless signals and a processor 118 coupled to and for controlling the operation of the user interface 114 and the transceiver 116. As an example, the user interface 114 may include a keypad 120, a microphone 121, a display 122 and/or a speaker 124 to enable the user to enter relevant information into or receive such information from the mobile unit 112. The mobile unit 112 may also include a memory 119, which can be used to store the relevant information.

As another example, the transceiver 116 may operate in accordance with a short-range wireless communications protocol, such as Bluetooth or any of the IEEE protocols of 802.15 (including 802.15.4) or any other standard that is designed for use in a wireless personal area network (WPAN). Although described here in terms of wireless communications, it is understood that the transceiver 116 may also serve as an interface for enabling hard-wired connections for data transmission between the mobile unit 112 and the vehicle 110, if so desired.

In another arrangement, the vehicle 110 can include a vehicle control system 126 for receiving one or more passenger profiles. For example, the control system 126 can include a transceiver 128 that receives passenger profiles, which may be associated with passengers of the vehicle 110. As will be explained below, the transceiver 128 can receive the passenger profiles when the passengers carrying the mobile units 112 come within a predetermined range of the vehicle 110.

The control system 126 can also have a notification unit 130 that can inform the driver of the vehicle 110 of at least a portion of the received passenger profiles For example, the notification unit 130 can include a speaker 132 and/or a display 134, both of which may broadcast to the driver relevant information regarding the passenger profiles. As pictured here, the transceiver 128 and the notification unit 130 may be integrated into the vehicle 110. Alternatively, the transceiver 128 and the notification unit 130 may be integrated into a mobile unit 112 carried by the driver of the vehicle 110. That is, the transceiver 128 may be synonymous with the transceiver 116, and the speaker 132 and display 134 may be synonymous with the speaker 124 and the display 122, respectively. Moreover, the mobile unit 112 can be designed to operate or control certain components of the vehicle 110, and certain components of the vehicle 110 can be configured to operate or control certain functions of the mobile unit 112.

Additionally, the control system 126 may include a processor 136, which can be coupled to the transceiver 128 and the notification unit 130. As an example, the processor 136 can be programmed to set one or more parameters of the vehicle 110 based on the passenger profiles. Further detail on this feature will be presented below. In one embodiment, the control system 126 may also include a regulation component 138, which can affect the operation of one or more systems (such as electrical or mechanical) of the vehicle 110. For example, the regulation component 138 may act as a speed governor to restrict the speed of the vehicle 110 or even as a kill switch to disable the vehicle 110.

Figure 2:
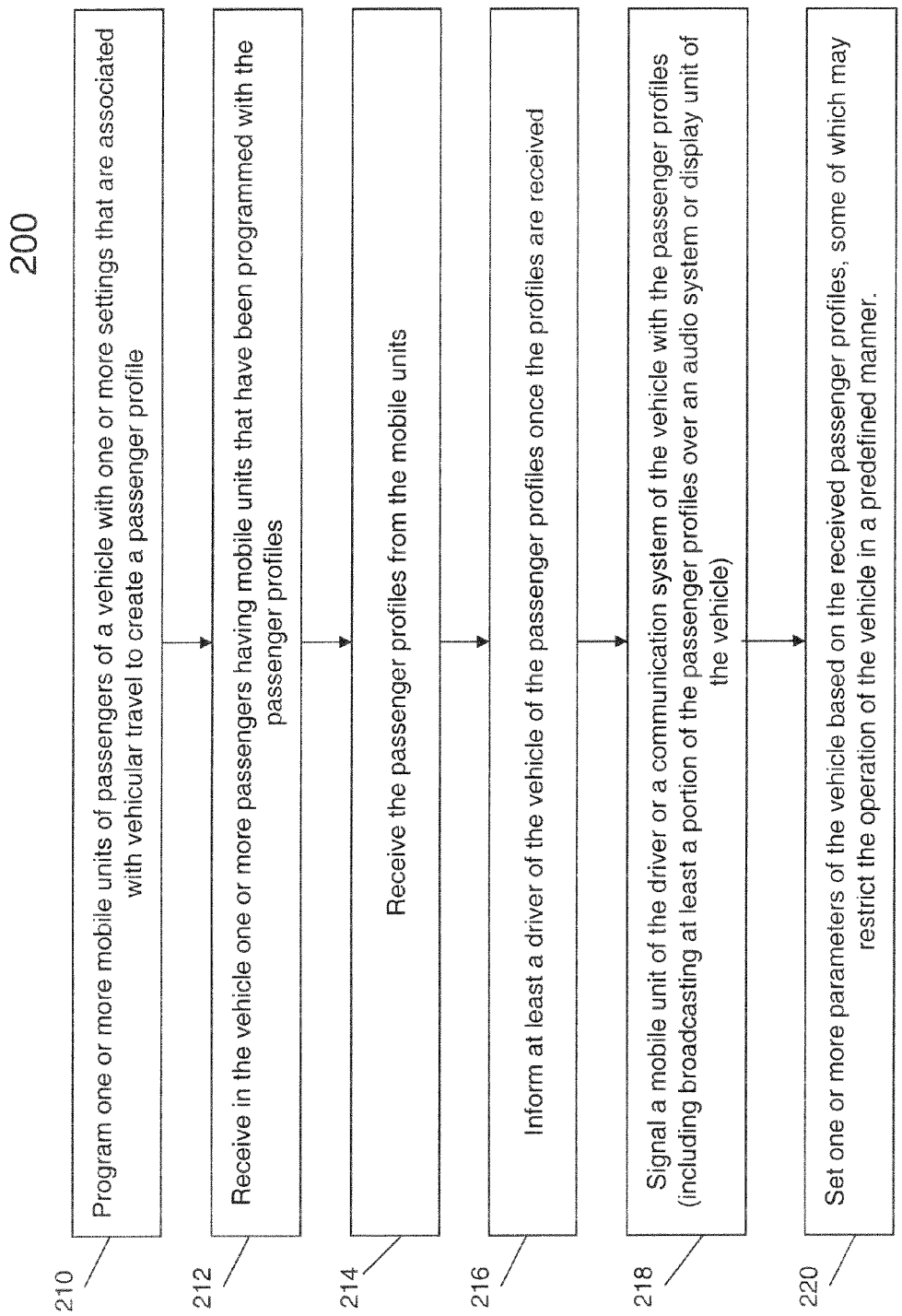
FIG. 2 illustrates a method for passenger profiles in accordance with an embodiment of the inventive arrangements.

Referring to FIG. 2, a method 200 for passenger profiles is shown. When describing the method 200, reference will be primarily made to FIG. 1, although it is understood that the method 200 can be practiced in any other suitable system or device. Moreover, the steps of the method 200 are not limited to the particular order in which they are presented in FIG. 2. The inventive method can also have a greater number of steps or a fewer number of steps than those shown in FIG. 2.

At step 210, one or more mobile units of passengers of a vehicle can be programmed with one or more settings that are associated with vehicular travel to create a passenger profile. At step 212, one or more passengers having mobile units that have been programmed with the passenger profiles can be received in a vehicle. The phrase "received in a vehicle" can mean the actual receipt of an object in the vehicle or the object coming within a predetermined range of the vehicle. The passenger profiles can then be received from the mobile units, as shown in step 214.

For example, referring to FIG. 1, the mobile unit 112 can be programmed with various settings to create a passenger profile. In particular, a user can enter relevant information into the mobile unit 112 through the user interface 114. For instance, the user can enter data through the keypad 120, the microphone 121 or the display 122, and the processor 118 can store this information in the memory 119. In one arrangement, these settings can be associated with vehicular travel.

The settings that are entered into the mobile unit 112 may affect one or more parameters of the vehicle 110. Examples of these parameters can include a maximum speed of the vehicle 110, a restriction on the use of portable electronic devices by the driver, a preferred or recommended travel route, a restricted area of travel, an enablement of a landmark notification signal or an enablement of a threshold variance signal. Of course, the invention is in no way limited to these particular examples, as those of skill in the art will appreciate that there are many other settings that can be programmed into the mobile unit 112.

Eventually, passengers that carry or are assigned to a mobile unit 112 having their passenger profiles can be received in (for purposes of the invention, "in" can be synonymous with "on") the vehicle 110. In addition, the passenger profiles can then be received from the mobile units 112. As an example, the processor 136 of the vehicle control system 126 can signal the transceiver 128 to periodically broadcast a beacon signal, which can have a predetermined range. This beacon signal can include a request for the mobile units 112 to transmit the passenger profiles. When the mobile units 112 come within this predetermined range, the mobile units 112 can transmit the passenger profiles, which can be received by the vehicle control system 126. As noted earlier, the vehicle control system 126 can be implemented in the vehicle 110 or the components of the control system 126 can actually be implemented in a mobile unit 112 of the driver of the vehicle.

Referring back to FIG. 2, at step 216, at least a driver of the vehicle can be informed of the passenger profiles once the profiles are received. In particular, at step 218, a mobile unit of the driver or a communication system of the vehicle can be signaled with the passenger profiles, including broadcasting at least a portion of the passenger profiles over an audio system or display unit of the vehicle. Additionally, at step 220, one or more parameters of the vehicle can be set based on the received passenger profiles, some of which may restrict the operation of the vehicle in a predefined manner.

For example, referring back to FIG. 1, the processor 136 of the control system 126 can receive the passenger profiles from the mobile units 112 and can forward this information to the display 134 and/or the speaker 132 of the notification unit 130. In accordance with previous discussion, the mobile unit 112 of the driver can receive the passenger profiles, and they can be broadcast over the speaker 124 or the display 122. As such, the driver of the vehicle 110 can be made aware of certain information relating to the passengers who will be in the vehicle 110. For example, if a parent has a child who may ride a passenger vehicle, such as a van, the parent may enter settings into the child's mobile unit 112 to create a passenger profile for the child. When that child, for example, comes within a predetermined range of the vehicle 110, the child's mobile unit 112 can transmit the passenger profile to the control system 126, which can inform the driver of the child's passenger profile.

For example, the passenger profile may indicate that the driver cannot exceed a particular speed or that the driver should not use portable electronic devices that may distract the driver while driving. As another example, the passenger profile may indicate to the driver a preferred or recommended route—such as a freeway with relatively light traffic—or an area where the child is not allowed to travel, like a high-crime neighborhood. Once so informed, the driver can act accordingly.

In another arrangement, the passenger profile may actually restrict or otherwise affect the operation of the vehicle 110 in a predefined manner. For example, if one of the parameters is a maximum speed, the processor 136 may signal the regulation component 138 to restrict the maximum speed of the vehicle 110 based on the passenger profile. As another example, if the driver's mobile unit 112 receives the passenger profiles, the driver's mobile unit 112 may disallow phone calls to be made over it (with the exception of an emergency call) for the duration of the trip, if that setting is part of one of the passenger profiles.

In addition, the passenger profiles can be used to activate or enable a landmark notification signal or an enablement of a threshold variance signal. For example, the processor 136, based on the passenger profile, can monitor the progress of the trip and can cause the transceiver 128 to signal a predetermined contact when the vehicle 110 reaches a predetermined location, i.e., a landmark. As a more specific example, the vehicle 110 (or the mobile unit 112 of the driver) can signal a mobile unit 112 of the parent with an indication that the vehicle 110 has reached a particular intersection or city. For any number of reasons, the speed of the vehicle 110 may exceed the maximum permitted speed by a certain percentage or may move beyond a predetermined range of a recommended route or within a predetermined range of a restricted area. In such a case, the vehicle 110 (or the mobile unit 112 of the driver) can signal, for example, the mobile unit 112 of the parent regarding this variance.

Those of skill in the art will appreciate that the passenger profiles can be used to inform the driver of virtually any type of information that relates to vehicular travel, and the invention is not limited to the examples listed here. Moreover, the passengers may actually be goods of commerce, such as those typically transported by train or tractor-trailers. These goods may include one or more mobile units 112 that can transmit their profiles to the vehicle 110. For example, a cargo of fine dinnerware may have a profile that indicates to the driver to use extreme care and not to exceed a particular speed during transport. If the cargo is valuable, such as expensive electronic equipment, the passenger profile can be set to enable the landmark notification or threshold variance signals described above.

It is also important to note that the driver is not necessarily limited to a human being. For example, the vehicle 110 may be an automated means of transport, such as a computer-controlled subway or monorail. As those of skill in the art will appreciate, the same restrictions, limitations or suggestions that apply with a human driver are applicable with an automated driver.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of providing a passenger profile, comprising:
   receiving one or more passengers having mobile units in a vehicle, wherein at least some of the mobile units have been programmed with passenger profiles;
   receiving the passenger profiles from the mobile units;
   informing at least a driver of the vehicle of the passenger profiles once the passenger profiles are received; and
   setting one or more parameters of the vehicle based on the received passenger profiles, wherein the parameters include a maximum speed of the vehicle, a restriction on the use of portable electronic devices by the driver, a preferred or recommended travel route, a restricted area of travel, an enablement of a landmark notification signal or an enablement of a threshold variance signal.

2. The method according to claim 1, wherein setting the parameters of the vehicle based on the received passenger profiles restricts the operation of the vehicle in a predefined manner.

3. The method according to claim 1, wherein receiving the passenger profiles from the mobile units comprises receiving the passenger profiles wirelessly through a Bluetooth transmission or an Institute of Electrical and Electronics Engineers (IEEE) 802.15.4 standard transmission.

4. The method according to claim 1, wherein informing the driver of the vehicle of the passenger profiles comprises signaling a mobile unit of the driver or a communication system of the vehicle with the passenger profiles.

5. The method according to claim 1, wherein informing the driver of the vehicle of the passenger profiles comprises broadcasting at least a portion of the passenger profiles over an audio system of the vehicle or a display unit of the vehicle.

6. A method of generating a passenger profile, comprising:
   programming a mobile unit of a passenger of a vehicle with one or more settings that are associated with vehicular travel to create the passenger profile;
   wherein a driver of the vehicle will be informed of at least a portion of the passenger profile when the mobile unit comes within a predetermined range of the vehicle;
   wherein the passenger profile includes a maximum speed of the vehicle, a restriction on the use of portable electronic devices by the driver, a preferred or recommended travel route, a restricted area of travel, an enablement of a landmark notification signal or an enablement of a threshold variance signal.

7. The method according to claim 6, wherein the passenger profile will restrict the operation of the vehicle in a predefined manner.

8. A mobile unit for generating a passenger profile, comprising:
   a user interface that receives one or more settings that are associated with vehicular travel of a passenger and form the passenger profile;
   a transceiver; and
   a processor coupled to the transceiver, wherein the processor is operable to cause the transceiver to transmit at least a portion of the passenger profile when a user of the mobile unit becomes a passenger of a vehicle such that a driver of the vehicle is made aware of the passenger profile;
   wherein following the transmission of the passenger profile, the passenger profile will set one or more parameters of the vehicle;
   wherein the parameters include a maximum speed of the vehicle, a restriction on the use of portable electronic devices by the driver, a preferred or recommended travel route, a restricted area of travel, an enablement of a landmark notification signal or an enablement of a threshold variance signal.

9. The mobile unit according to claim 8, further comprising a memory for storing the passenger profile.

10. The mobile unit according to claim 8, wherein the transceiver is a Bluetooth transceiver or an IEEE 802.15.4 transceiver.

11. A vehicle control system for receiving one or more passenger profiles, comprising:
    a transceiver that receives the passenger profiles within a predetermined range of the vehicle, wherein the passenger profiles are associated with passengers of the vehicle;
    a notification unit that informs a driver of the vehicle of at least a portion of the passenger profiles; and
    a processor coupled to the transceiver that is operable to set one or more parameters of the vehicle based on the passenger profiles. wherein the parameters include a maximum speed of the vehicle, a restriction on the use of portable electronic devices by the driver, a preferred or recommended travel route, a restricted area of travel, an enablement of a landmark notification signal or an enablement of a threshold variance signal.

12. The system according to claim 11, wherein setting the parameters of the vehicle based on the passenger profiles restricts the operation of the vehicle in a predefined manner.

13. The system according to claim 11, wherein the notification unit includes a speaker or a display.

14. The system according to claim 11, wherein the transceiver and notification unit are integrated into the vehicle or a mobile unit carried by the driver.

* * * * *